(12) United States Patent
Thierry et al.

(10) Patent No.: US 9,920,185 B2
(45) Date of Patent: Mar. 20, 2018

(54) SURFACE ENERGY MODIFIED PARTICLES, METHOD OF MAKING, AND USE THEREOF

(71) Applicant: Powder Treatment Technology LLC, Royal Oak, MI (US)

(72) Inventors: Rolf Thierry, Sindelfingen (DE); Frank Thierry, Goodrich, MI (US); George Osenga, St. Louis Park, MN (US)

(73) Assignee: Powder Treatment Technology, LLC, Royal Oak, MI (US)

( * ) Notice: Subject to any disclaimer, the term of this patent is extended or adjusted under 35 U.S.C. 154(b) by 0 days.

(21) Appl. No.: 14/680,124

(22) Filed: Apr. 7, 2015

(65) Prior Publication Data

US 2015/0284534 A1    Oct. 8, 2015

Related U.S. Application Data

(60) Provisional application No. 61/976,100, filed on Apr. 7, 2014.

(51) Int. Cl.
| | |
|---|---|
| *C08K 5/3417* | (2006.01) |
| *B22F 1/00* | (2006.01) |
| *B22F 1/02* | (2006.01) |
| *C04B 35/626* | (2006.01) |
| *C08K 3/04* | (2006.01) |

(Continued)

(52) U.S. Cl.
CPC ........... *C08K 5/3417* (2013.01); *B01J 19/088* (2013.01); *B22F 1/0088* (2013.01); *B22F 1/02* (2013.01); *C04B 35/62665* (2013.01); *C08K 3/04* (2013.01); *C23F 1/00* (2013.01); *B22F 2001/0092* (2013.01); *B22F 2999/00* (2013.01)

(58) Field of Classification Search
CPC .......... B22F 2999/00; B22F 1/02; B22F 1/00; C04B 35/00; C04B 35/62665
USPC ............. 427/535, 332.8, 180–206, 458–486, 427/212–222
See application file for complete search history.

(56) References Cited

U.S. PATENT DOCUMENTS

| | | | | |
|---|---|---|---|---|
| 3,300,332 A | * | 1/1967 | Gorham | B29C 70/58 118/418 |
| 4,608,309 A | * | 8/1986 | Loh et al. | 428/409 |
| 4,867,573 A | * | 9/1989 | Tsutsui et al. | 366/114 |

(Continued)

FOREIGN PATENT DOCUMENTS

| | | | |
|---|---|---|---|
| EP | 2578975 | 4/2013 | |
| JP | 04-318041 | * 11/1992 | ............... C08K 9/02 |
| WO | 2012/164288 A2 | 12/2012 | |

OTHER PUBLICATIONS

European Extended Search Report for Appl. No. EP15162690 dated Jul. 24, 2015.

*Primary Examiner* — David Turocy
*Assistant Examiner* — Mohammad Mayy
(74) *Attorney, Agent, or Firm* — Brinks Gilson & Lione

(57) ABSTRACT

An apparatus and a process for modifying the surface energy of particles using a reactive gas or reactive energetic species generated in an excited and/or unstable gas stream is provided. The apparatus and process incorporates a process container, a portion of which is movable and having a shape in which the particles are tumbled during exposure to the energetic species. The resulting surface treatment allows the energy modified particles to be more easily dispersed in a liquid medium with a reduction in the occurrence of particle agglomeration or flocculation.

19 Claims, 10 Drawing Sheets

(51) Int. Cl.
*C23F 1/00* (2006.01)
*B01J 19/08* (2006.01)

(56) References Cited

U.S. PATENT DOCUMENTS

| | | | | |
|---|---|---|---|---|
| 4,946,549 | A | * | 8/1990 | Bachman ................. G03F 7/427 204/192.36 |
| 5,106,533 | A | * | 4/1992 | Hendrickson ....... B01F 3/04439 106/31.65 |
| 5,439,984 | A | * | 8/1995 | Kodama ................. B29C 59/14 525/332.8 |
| 6,197,120 | B1 | | 3/2001 | David |
| 6,620,256 | B1 | * | 9/2003 | Arno ................... C23C 16/4405 134/2 |
| 2003/0157000 | A1 | | 8/2003 | Janssen et al. |
| 2003/0207112 | A1 | * | 11/2003 | Yadav ..................... A61L 27/06 428/402 |
| 2005/0158549 | A1 | * | 7/2005 | Khabashesku ........ C01B 31/065 428/403 |
| 2013/0320274 | A1 | * | 12/2013 | Walters ................. B01J 19/088 252/511 |
| 2014/0093445 | A1 | | 4/2014 | DiLuca |

\* cited by examiner

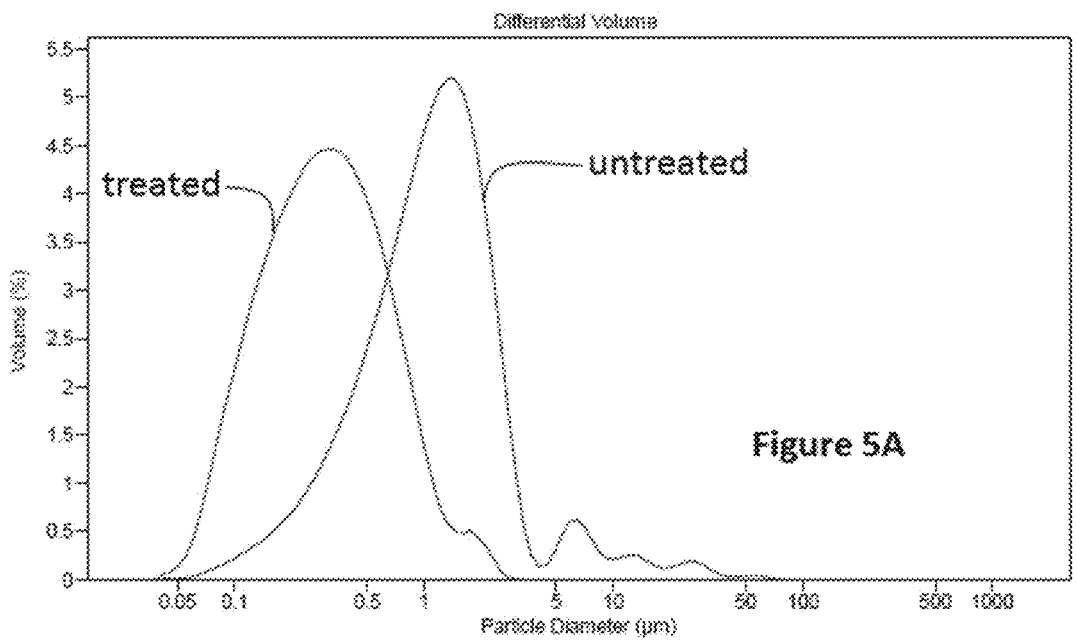

Figure 6B

Volume Statistics – Treated Particles in Water

```
Calculations from 0.040 µm to 2000 µm
Volume:           100%
Mean:             0.685 µm        S.D.:        0.637 µm
Median:           0.368 µm        Variance:    0.405 µm²
Mean/Median ratio: 1.861          C.V.:        92.9%
Mode:             0.326 µm        Skewness:    1.251 Right skewed
                                  Kurtosis:    0.273 Leptokurtic <10%      <25%      <50%      <75%      <90%
0.169 µm  0.227 µm  0.368 µm  1.089 µm  1.783 µm
```

Figure 6C

Volume Statistics – Treated Particles in MIAK

```
Calculations from 0.040 µm to 2000 µm
Volume:           100%
Mean:             0.528 µm        S.D.:        0.523 µm
Median:           0.322 µm        Variance:    0.274 µm²
Mean/Median ratio: 1.640          C.V.:        99.2%
Mode:             0.326 µm        Skewness:    2.376 Right skewed
                                  Kurtosis:    5.038 Leptokurtic <10%      <25%      <50%      <75%      <90%
0.192 µm  0.246 µm  0.322 µm  0.664 µm  0.950 µm
```

Figure 6D

Volume Statistics – Untreated Particles in MIAK

```
Calculations from 0.040 µm to 2000 µm
Volume:           100%
Mean:             6.060 µm        S.D.:        6.568 µm
Median:           3.499 µm        Variance:    43.13 µm²
Mean/Median ratio: 1.732          C.V.:        108%
Mode:             1.552 µm        Skewness:    1.821 Right skewed
                                  Kurtosis:    3.081 Leptokurtic <10%      <25%      <50%      <75%      <90%
0.895 µm  1.486 µm  3.499 µm  8.279 µm  14.58 µm
```

SURFACE ENERGY MODIFIED PARTICLES, METHOD OF MAKING, AND USE THEREOF

CROSS-REFERENCE TO RELATED APPLICATIONS

This application claims the benefit of the filing date under 35 U.S.C. § 119(e) of U.S. Provisional Application No. 61/976,100 filed Apr. 7, 2014, the entire contents of which is hereby incorporated herein by reference.

FIELD

This disclosure generally relates to a process for modifying the surface energy of particles by treatment with reactive gases or other reactive energetic species in order to enhance the dispersibility of the particles in a flowable medium. More specifically, this disclosure related to a process that allows for the preparation of surface energy modified particles and dispersions of these surface energy modified particles in a flowable medium, as well as coatings and other finished product compositions prepared using these surface energy modified particles and/or dispersions.

BACKGROUND

The statements in this section merely provide background information related to the present disclosure and may not constitute prior art.

Particle agglomeration is a natural phenomenon that may be described as the flocculation or coalescence of individual particles or particle aggregates that occurs in powders or finely-divided particles in bulk solid form or upon attempting to disperse such finely-divided particles into a liquid or flowable medium, such as a solvent, a polymer, a plastic, or an elastomeric matrix. In some instances, the surface energy of the particles is lower than the magnitude necessary for the particles to be properly dispersed in the flowable medium. In powders, the occurrence of agglomeration can be undesirable resulting in uncontrolled build-up, caking, bridging, or lumping. Similarly, the occurrence of particle agglomeration during the dispersion of finely-divided particles in a liquid or flowable medium may undesirably affect the material properties associated with the dispersion, such as color strength, viscosity, texture, compressibility, abrasiveness, and reactivity, to name a few.

The effective use of particle dispersions in many applications requires that the formation of particle agglomerates during the dispersion process be either all together avoided or minimized, such that any agglomerates that are formed can be subsequently broken-down into individual particles or particle aggregates without damaging the particles. For example, coating formulations that exhibit high brilliance and color strength are characterized by the degree of individual pigment dispersion, pigment particle size, and long-term stabilization of the dispersed pigments in the liquid carrier fluid.

The break-up of agglomerated particles may be accomplished through the use of various mechanical mixing techniques, such as media milling, high shear mixing, or ultrasonication. The break-up of agglomerates using these techniques is controlled predominantly by the amount of energy input. For example, during media milling, the break-up of particle agglomerates occurs due to the impact between the agglomerates and the milling media and by the creation of high shear rates. Although the use of these techniques can be effective in reducing particle agglomerates, these techniques also are time consuming, increase production costs, alter the shape or grain structure of the individual particles or particle aggregates, and/or introduce contaminants into the dispersion or finished product composition.

The dispersion of individual particles or particle aggregates in a liquid or flowable medium represents a technical problem which is difficult to solve because flocculation or agglomeration is a phenomenon that can occur in the bulk solid or powder and is difficult to break-up after its occurrence without altering or damaging the individual particles or particle aggregates.

SUMMARY

The present disclosure provides a process and an apparatus for modifying the surface energy of particles. The process generally comprises the use of a low pressure system that has at least one vacuum chamber, a vacuum pump system, a process container, and, optionally, one or more power sources. A predetermined amount of particles are placed into a process container that has a center axis with at least a portion of the process container capable of being rotated, moved, or vibrated, such that the particles are stirred or moved. The process container can either be the vacuum chamber or a separate container located in and exposed to the vacuum chamber. A filter may be positioned in a location that keeps or maintains the particles in the process chamber. Optionally, the low pressure system may further comprise at least one load lock chamber, so that the process may be operated as a continuous process.

The pressure in the vacuum chamber is reduced using the vacuum pump system to an initial pressure that is below atmospheric pressure and variable. Optionally, the initial pressure may be raised to a variable working pressure that is greater than the first pressure, and optionally, is at or above atmospheric pressure. Alternatively, the working pressure of the process may be between 0.001 mbar and 20 bar. At least one primary gas stream having a variable or pulsed flow rate is allowed to enter the vacuum chamber. The pressure in the low pressure system is adjusted using the vacuum pump system, changing the flow rate of the primary gas stream, or a combination thereof to establish a working pressure that is either the same as or different from the initial pressure. The process container is made to rotate, move, or vibrate. Optionally, one or more power sources are used to supply the energy necessary to form a plasma in the gas stream.

When utilized, the power source supplies the energy in the frequency range from low kHz to high GHz, alternatively, between about 40 kHz to about 2.45 GHz; and at a power ranging from 0.1 watts/cm$^2$ to about 500 watts/cm$^2$ of electrode surface for kHz and MHz frequencies or between 0.01 watts/liter to 1000 watts/liter of chamber volume for GHz frequency. The at least one power source may use radio frequency energy, microwaves, alternating electrical current, direct electrical current, or a combination thereof in generating the plasma. When the power source includes a plurality of electrodes to provide the energy necessary to form the plasma; the electrodes may be located either in the process container or outside the process container, optionally, in a second vacuum chamber. The electrodes may be cylindrical, plate shaped, or square in shape other shape without limitation as desired to form the plasma.

The surface of the particles is exposed to a reactive gas or to reactive energetic species formed by the interaction of the plasma with the reactive precursors, thereby, forming particles that exhibit a modified surface energy. Finally, the vacuum chamber is vented and the surface energy modified particles are collected. Optionally, the process may further comprise cooling the particles, vacuum chamber, or at least one component therein, optionally, the at least one component being an electrode.

According to another aspect of the present disclosure the process may further comprise allowing at least one secondary gas stream having a variable or pulsed flow rate to enter the vacuum chamber. This least one secondary gas stream comprises one or more reactive gases or precursors to reactive energetic species that are different in composition than the one or more reactive gases or precursors in the primary gas stream. Optionally, the vacuum chamber may be purged with an inert gas prior to introduction of the at least one secondary gas stream. The pressure in the vacuum system is readjusted using the vacuum pump system, changing the flow rate of the secondary gas stream, or a combination thereof to reestablish a working pressure that is either the same as or different from the initial pressure. The surface of the particles is exposed to either the one or more reactive gases in the secondary gas stream or the reactive energetic species generated by the interaction of the plasma with the precursors in the secondary gas stream, thereby, providing a second surface treatment to the energy modified particles.

According to another aspect of the present disclosure, upon collecting the surface energy modified particles, the treated particles are either pelletized or placed in to an environment that preserves the surface treatment. Preserving the surface treatment may be accomplished by placing the treated particles into a sealable container or dispersing the surface energy modified particles in a flowable medium. Alternatively, the treated particles are dispersed in water, a solvent, a polymer, a gum stock, or a mixture thereof. The surface energy modified particles may be dispersed in the flowable medium by any means known to one skilled in the art, including but not limited to stirring, mixing, shaking, or a combination thereof. Preservation of the surface treatment may be assisted by dispersing an ionic surfactant, a nonionic surfactant, or a combination thereof in the flowable medium. When the flowable medium is water or a mixture of water and one or more solvents, the pH of the water or the water/solvent mixture is greater than 7.0 and less than about 10.0.

The process container may be any shape that induces or allows particles to be effectively tumbled or moved such that their surface area is exposed to the energetic species or reactive gas during the process. Alternatively, the process container is spherical, elliptical, or cylindrical in shape, or the process container has a polygonal shape with three or more sides. The polygonal shape may be, without limitation, triangular, square, rectangular, or a combination thereof. The process container may include at least one baffle or paddle, alternatively, two or more baffles or paddles. The at least one baffle may represent the portion of the process container that is rotated, moved, or vibrated. The process container may be rotated around its center axis or moved in any direction other than being rotated around its center axis.

According to another aspect of the present disclosure, the at least one primary gas stream includes a gas selected from the group of fluorine ($F_2$), nitrogen trifluoride, or another fluorinated gaseous species. The at least one primary gas stream may optionally include a second gas selected from the group of nitrogen, argon, helium, neon, xenon, and krypton. The ratio of $1^{st}$ gas to $2^{nd}$ gas may be without limitation between about 40:60 and about 1:99; alternatively between about 20:80 and about 10:90. During operation, the at least one gas stream has a flow rate that is between 1 cm³/min and 10,000 liters/min.

The particles are selected as one from the group of metals, metalloids, metal oxides, metalloid oxides, carbon black or graphite, organic resins or pigments, silicone resins, mineral fillers, inorganic resins or pigments, organometallic oxides, organometalloid oxides, organomixed oxide resins, and silicone or organic rubber crumb. The particles may have a mean particle size in the range of 1 nanometer up to about 100 micrometers; and a surface area that is in the range of $1.0 \, m^2/g$ to $5.0 \times 10^3 \, m^2/g$. According to another aspect of the present disclosure, a dispersion comprising a plurality of treated particles formed according the process described above and herein and a flowable medium is provided. The flowable medium may be, without limitation, water, a solvent, a polymer, a gum stock, or a mixture thereof. The dispersion comprises at least 0.1 wt. % of the surface energy modified particles as compared to the weight of the entire dispersion. The dispersion may also comprise a plurality of untreated particles.

According to yet another aspect of the present disclosure, a finished product composition is provided that is comprised of a plurality of particles whose surface energy is modified according to the method described herein.

According to another aspect of the present disclosure, a low pressure system used to modify the surface of particles generally is provided that comprises at least one vacuum chamber; a process container that has a center axis and at least a portion of which is capable of being rotated, moved, or vibrated; a filter positioned in a location, such that the particles are maintained within the process container, a vacuum pump system to reduce the pressure in the vacuum chamber to a variable pressure that is below atmospheric pressure; at least one gas stream having a variable or pulsed flow rate and comprising one or more reactive gases or precursors to reactive energetic species and in sustaining a plasma; and optionally, at least one power source to supply the energy necessary to form a plasma in the gas stream capable of converting the precursors to the reactive energetic species. The process container may either be the vacuum chamber or a separate container located in and exposed to the vacuum chamber. The process container is capable of holding a predetermined amount of particles. Optionally, the low pressure system may further comprise at least one baffle that may represent the portion of the process container that is rotated, moved, or vibrated. The low pressure system may further comprise at least one load lock that allows the system to be operated continuously. The low pressure system may also comprise a means to cool the particles, vacuum chamber or at least one component therein, optionally, the at least one component being an electrode. Further areas of applicability will become apparent from the description provided herein. It should be understood that the description and specific examples are intended for purpose of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5A is a comparison of the particle size distribution measured for a dispersion of treated copper phthalocyanine particles against the particle size distribution measured for untreated copper phthalocyanine particles;

FIG. 5B is an arithmetic description of the volume statistics calculated for the particle size distribution measured for the treated particles of FIG. 5A;

FIG. 5C is an arithmetic description of the volume statistics calculated for the particle size distribution measured for the untreated particles of FIG. 5A;

FIG. 6B is an arithmetic description of the volume statistics calculated for the particle size distribution measured for the treated particles of FIG. 6A dispersed in water;

FIG. 6C is an arithmetic description of the volume statistics calculated for the particle size distribution measured for the treated particles of FIG. 6A dispersed in MIAK; and FIG. 6D is an arithmetic description of the volume statistics calculated for the particle size distribution measured for the untreated particles of FIG. 6A dispersed in MIAK.

DETAILED DESCRIPTION

Figure 1A:
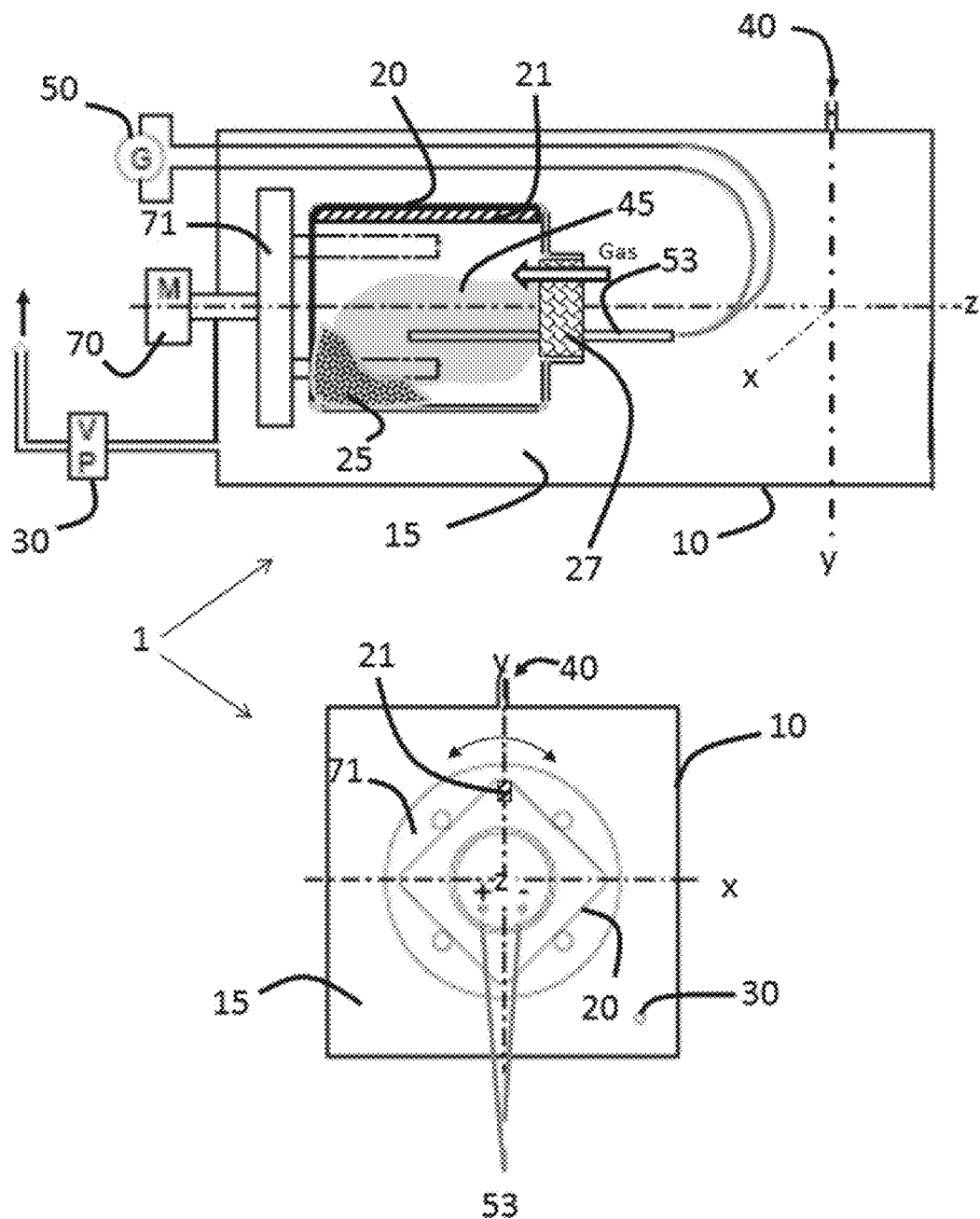
FIGS. 1A, 1B, and 1C are schematic representations of an apparatus used to treat the surface of particles according to the teachings of the present disclosure.

The following description is merely exemplary in nature and is in no way intended to limit the present disclosure or its application or uses. It should be understood that throughout the description, corresponding reference numerals indicate like or corresponding parts and features.

The present invention generally relates to an apparatus and a process for modifying the surface energy of particles using one or more reactive gases or precursors to a reactive energetic species generated in an excited gas stream. The surface energy modified particles made and used according to the teachings contained herein are described throughout the present disclosure in conjunction with inorganic and/or organic pigments, fillers, or other powder additives used in paints, inks, or coatings, as well as in plastic or elastomeric manufactured goods, in order to more fully illustrate the concept. The incorporation and use of the apparatus and process disclosed herein in conjunction with other types of particles or powders is contemplated to be within the scope of this disclosure. The term "surface" as used herein is not meant to indicate that a uniform layer of the entire surface of a particle is treated, rather that portions of the particle's surface may exist that remain untreated or the treatment as applied to portions of the particle's surface may be unevenly thick or thin.

Generally, the process comprises the evacuation of a vessel or container containing particles or powder whose surface is to be modified, followed by refilling of the container with a reactive gas or a gaseous precursor to a reactive energetic species. According to one aspect of the present disclosure, the precursor gas is subsequently energized using any means known to one skilled in the art for generating a plasma. Several specific examples of generating a plasma, include but are not limited to, energizing the gas using radio frequency energy, microwaves, alternating electrical current, direct electrical current, or a combination thereof. The energetic species created within the gas plasma may include ions, electrons, radicals, metastable species, and/or photons. These energetic species bombard the surface of the particles that is in contact with gas plasma, thereby, transferring the energy from the plasma to the particles' surface. This transfer of energy is dissipated within the powder via one or more chemical or physical processes with the end result being modification of the particles' surface energy.

Optionally, a reactive gas, such as fluorine ($F_2$) for one example among many examples, may be formed in the gas plasma. In this case, the process may comprise generating the gas plasma upstream from the particles or powder either in the same vessel or in a different vessel or container. In other words, the particles or powder do not need to be in contact with the plasma, rather the subsequent interaction of the reactive gas and the surface of the particles can result in the modification of the particles' surface energy. Alternatively, a reactive gas, such as $F_2$ for example, or a mixture of a reactive gas and an inert gas, such as $F_2/N_2$ for example, can be directly input into the vacuum chamber as a gas stream for interaction with the particles in the process container.

The modification of a particle's surface using the process of the present disclosure results from the reactive gases or reactive energetic species in the plasma reacting with surface of the particle up to a depth ranging from a few angstroms (Å) to several micrometers (μm) without changing the bulk properties exhibited by the particles. Bulk properties as used herein refer to intensive physical properties of the particles (e.g., density, hardness, etc.) that do not depend upon the size of the particles. Optionally, when desirable modification of various operating variables used in the process may result in the bulk properties associated with the particles being chemically modified. Several process parameters that affect the chemical and physical characteristics of the plasma can be directly controlled as further described herein in order to achieve the desired surface modification. These process parameters include, but are not limited to, gas composition, the power and frequency of the applied energy, treatment or exposure time, operating pressure, electrode location or design, and reactor and/or container design. The reactor or vacuum chamber may be the same or different than the process vessel or container as further described herein.

Optionally, at least one secondary gas stream may be used to provide a secondary treatment or modification of the particles' surface. This least one secondary gas stream may comprise one or more reactive gases or precursors to reactive energetic species that are different in composition than the one or more reactive gases or precursors in the primary gas stream. When desirable, the vacuum chamber may be purged with an inert gas to remove the at least one primary gas stream prior to introduction of the at least one secondary gas stream.

The present invention provides a manufacturer with the ability to treat the surface of particles in a dry and cost-effective process. Since the surface energy modified particles formed herein are able to be more easily dispersed in a flowable medium, the surface modification of these particles benefits the manufacturer by reducing the manufacturing costs associated with incorporating the particles into a finished product formulation, such as coatings, films, inks, composites, plastic or elastomeric manufactured goods, gels, ointments, adhesives, or pastes, among others. During the formation of a dispersion in a flowable medium, the presence of the surface treatment on the particles assists in reducing or eliminating the reoccurrence of particle agglomeration or flocculation. The term "particles" as used herein refer to both primary particles and to small particle aggregates, which can be defined as a cluster of several primary particles. In comparison, particle agglomerates involve the flocculation of several particle aggregates together or to the interaction of a large number of primary particles.

According to one aspect of the present disclosure, the particles may be comprised of any suitable powder, including but not limited to metals, metalloids, metal oxides, metalloid oxides, carbon black or graphite, organic resins and pigments, silicone resins, mineral fillers (e.g., talc, etc.), inorganic resins and pigments, organometallic oxides, organometalloid oxides, and silicone or organic rubber. Alternatively, the particles represent pigments or additives used in a coating, paint, ink, or film formulation.

Several non-limiting examples of suitable metalloid oxide particles include silicates, boron trioxide ($B_2O_3$), and silica ($SiO_2$), including but not limited to fumed silica (e.g., Aerosil®, Evonik Industries). The organic resins and pigments may comprise without limitation polymers, dyestuffs, paint pigments, fragrances, flavorings, and mixtures thereof. Mineral fillers, organometallic oxides, and organometalloid oxides may include but not be limited to silicone resins, clays, calcium carbonate ($CaCO_3$), sodium carbonate ($Na_2CO_3$), barium sulfate ($BaSO_4$), talc, and mica. Several examples of metal oxide particles include $TiO_2$, $ZrO_2$, $Fe_2O_3$, $Al_2O_3$, $Li_2O$, $Na_2O$, PbO, ZnO, CaO, $Pb_3O_4$, CuO, and mixtures thereof. Finally, organic rubber may include particles of ethylene propylene diene monomer (EPDM) rubber and Polypropylene (PP), among others.

The particles may be spherically shaped, irregularly shaped, or any other shape available on a commercial or experimental basis. The particles may be solid, hollow, or porous depending upon the type and/or nature of the particles and the intended application. The particles in a powder are typically present in various sizes and give rise to a particle size distribution that can be characterized by a mean or average particle size or diameter. The mean particle size may be determined using any known technique, for example, sieving, microscopy, Coulter counting, dynamic light scattering, or particle imaging analysis, to name a few. The mean particle size may be in the range of about 1 nanometer (nm) up to about 100 micrometers (μm); alternatively, greater than 5 nm; alternatively, less than about 50 μm; alternatively, between about 10 nm and about 10 μm. The particles may exhibit a surface area that is in the range of about 1.0 $m^2/g$ to $5.0 \times 10^3$ $m^2/g$; alternatively, about 10 $m^2/g$ to $1 \times 10^3$ $m^2/g$; alternatively, about 50 $m^2/g$ to 500 $m^2/g$.

The selection of the primary gas stream composition and, optional, secondary gas stream composition that is used to modify the surface energy of the particles depends upon the surface characteristics of the surface energy modified particles that are either required or desirable. For example, an oxidizing gas or a reducing gas may be used alone or in combination with an inert gas as the reactive gas stream or to form the plasma and the energetic species therein. Specific examples of oxidizing gases include, but are not limited to, oxygen ($O_2$), water ($H_2O$), carbon dioxide ($CO_2$), carbon monoxide (CO), nitrogen oxides (i.e., $NO_2$), nitrogen trifluoride ($NF_3$), air, and mixtures thereof. Several examples of reducing gases include, without limitation, hydrogen ($H_2$), methane ($CH_4$), fluorine ($F_2$), sulfur hexafluoride ($SF_6$), tetrafluoromethane ($CF_4$), hexafluoroethane ($C_2F_6$), and ammonia ($NH_3$), among others. Inert gases may include nitrogen ($N_2$), argon (Ar), helium (He), neon (Ne), xenon (Xe), and krypton (Kr), among others. Alternatively, the gas stream comprises either $F_2$ or $NF_3$ and the optional inert gas is $N_2$. When an oxidizing or reducing gas is used with an inert gas, the resulting gas mixture may comprise about 1% to about 99% of the inert gas and about 99% to about 1% of the oxidizing or reducing gas. Optionally, the oxidizing or reducing gas may occupy 100% of the gas stream. Alternatively, the ratio of the reactive gas or the precursor gas to the inert gas ranges from about 40:60 to 1:99; alternatively from about 10:90 to about 20:80.

Figure 1B:
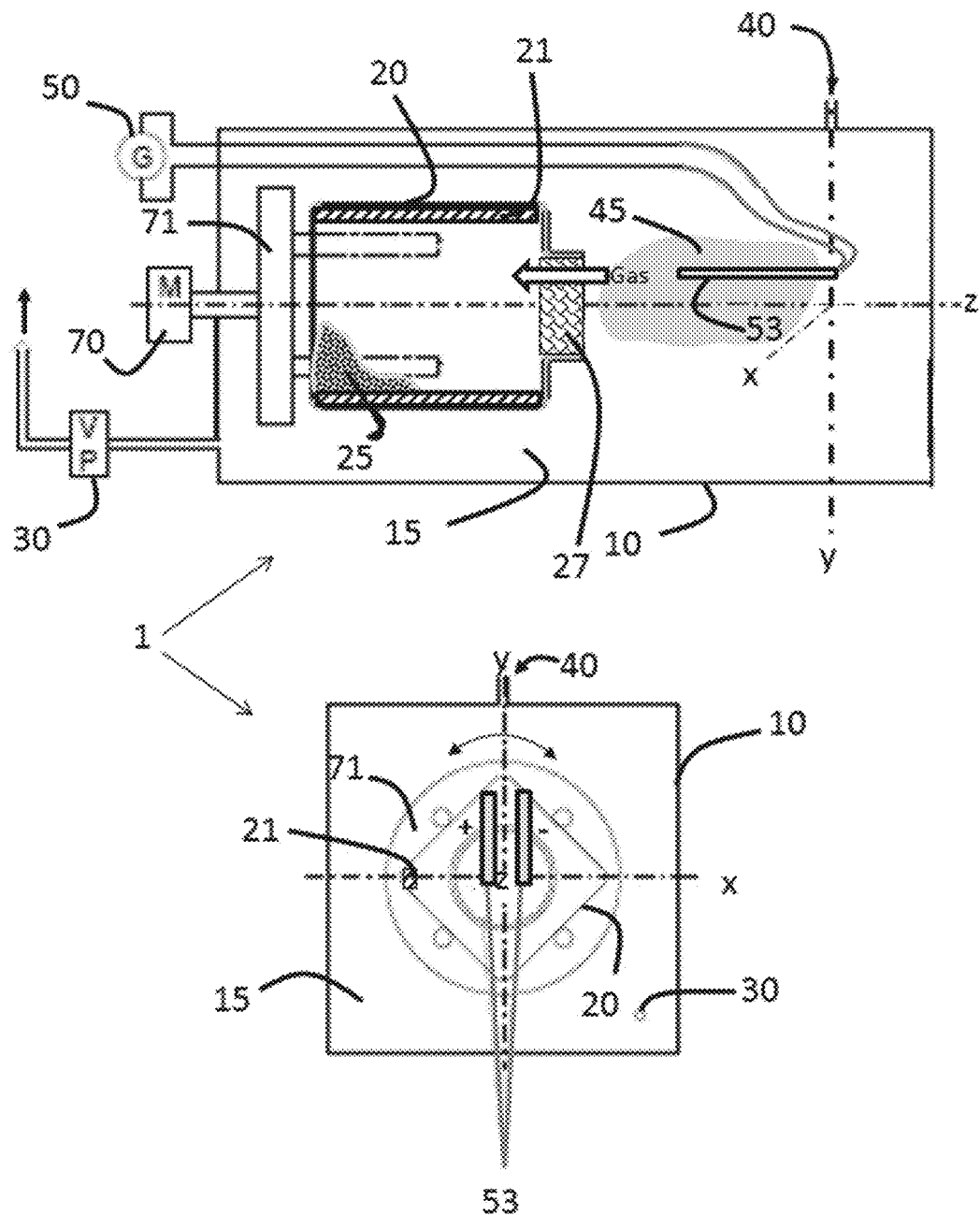
Figure 1C:
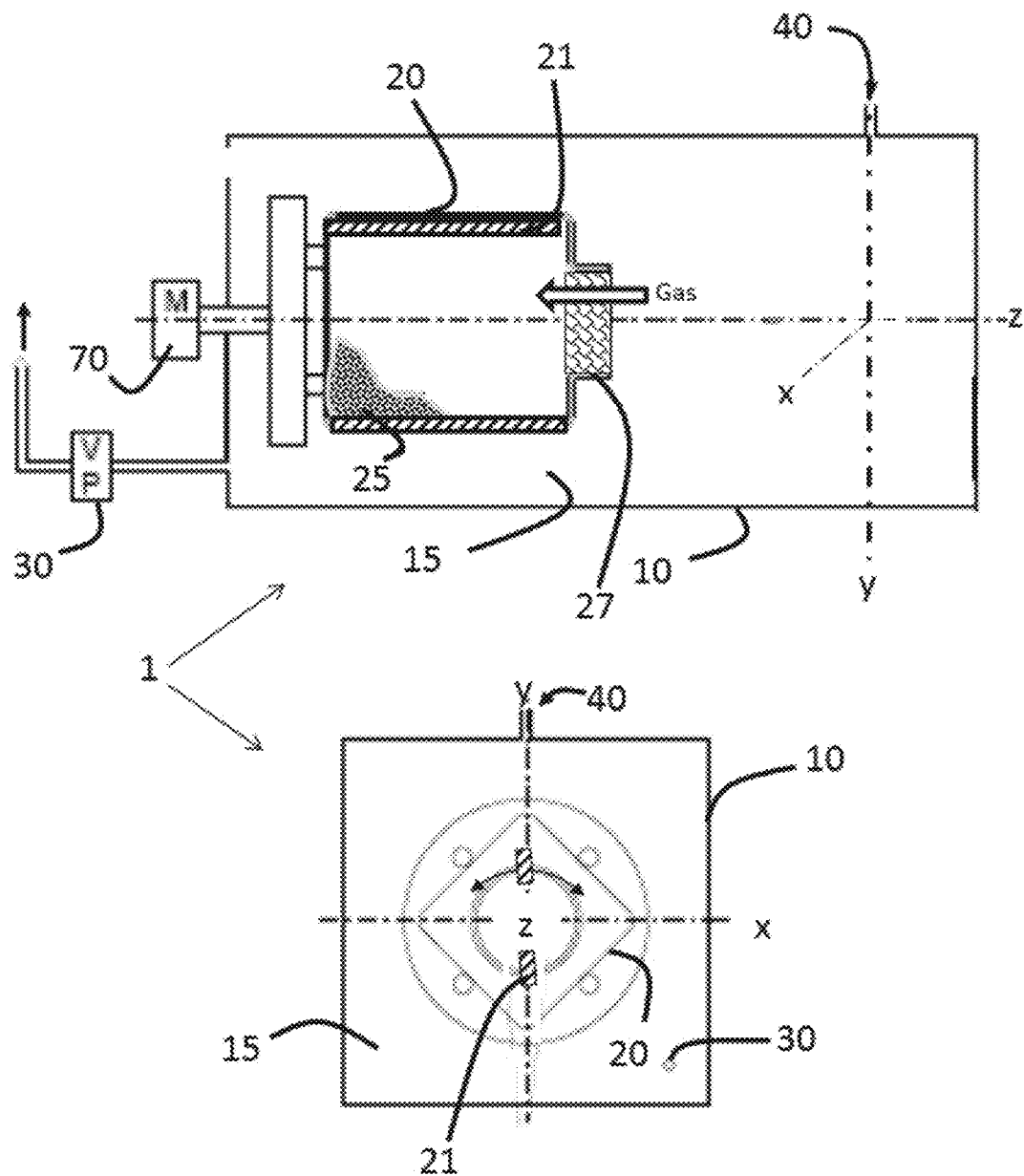

Referring to FIGS. 1A, 1B, and 1C, the low pressure system or apparatus 1 that is used to modify the surface energy of particles according to the teachings of the present disclosure generally comprises at least one vacuum chamber 10, a process container 20 located in and exposed to the vacuum chamber 10, a vacuum pump system 30 to reduce the pressure in the vacuum chamber 10 to an initial pressure 15 that is below atmospheric pressure and variable; at least one gas stream 40 comprising one or more reactive gases or precursors to reactive energetic species. The process container 20 is capable of holding a predetermined amount of particles 25. The vacuum system may include one or more vacuum pumps to reduce the pressure in the one or more vacuum chambers used in the system. The low pressure system 1 also includes a filter 27 positioned in a location that is capable of maintaining the particles 25 in the process container 20. The process container 20 may include at least one baffle 21, alternatively, two or more baffles 21. The at least one baffle 21 may represent the portion of the process container 20 that is rotated, moved, or vibrated (best shown in FIG. 1C). The process container 20 may be rotated around its center axis or moved in any direction other than being rotated around its center axis.

Referring now to FIGS. 1A and 1B, the gas stream 40 is used to form and sustain a plasma 45. The low pressure system 1 may incorporate one or more high frequency generators or power sources 50 to supply the energy necessary to form the plasma 45 in the gas stream 40. One means to provide the energy to the gas stream 40 is through the use of a set of electrodes 53 The electrodes 53 may be placed inside the process container 20 (FIG. 1A) or outside the process container 20 (FIG. 1B). When the electrodes 53 are located within the process container 20, the particles 25 may be in direct contact with the gas plasma 45, which is desirable when reactive energetic species are formed by the interaction of the plasma 45 with the gas stream 40. When a reactive gas, such as $F_2$, is generated by the gas plasma 45, it may be useful to located the electrodes 53 outside the process container 20, e.g., upstream from the particles 25.

When desirable the apparatus 1 may further comprise a means to cool (not shown) the particles 25, vacuum chamber 10 and/or optionally, the electrodes 53. Such cooling means may include, but not be limited to heat transfer through the use of a solid or liquid heat sink that is in contact with the vacuum chamber 10 and/or a component contained therein, such as but not limited to the electrodes 53.

During operation, at least a portion of the process container 20 may be rotated by a motor 70 around its center axis (e.g., z axis), vibrated, or otherwise moved, i.e., vertically or at some other angle in the direction of the x, y, or z axis in order to cause the particles to be agitated, moved or tumbled, thereby, exposing a greater amount of surface area to the energetic reactive species generated by the interaction of the plasma and gas or upon exposure to a reactive gas, such as $F_2$. The portion of the process container 20 that may be rotated, moved, or vibrated can be the baffles or paddles 21. The rate of rotation may be selected from about 1 rpm to about 300 rpm in order to maximize the exposure of the particles' surface to the reactive gas or reactive energetic species.

When the process container is rotated around its center axis (e.g., z axis), the process container 20 is preferably not round (spherical, cylindrical, or elliptical, etc.) when no rotatable or movable baffles 21 are present, because such a shape does not result in the movement of the particles in a manner that provides sufficient exposure of the particles' surface to the plasma. Rather in this case the shape of the rotatable process chamber 20 is polygonal in nature with such polygonal shape having three or more sides. Alternatively, the polygonal shape is triangular, square, rectangular, or a combination thereof. When baffles or paddles 21 are present and represent a portion of the process container 20 that rotates, moves, or vibrates, then the process container 20 may be any shape including spherical, cylindrical, or elliptical, as well as polygonal. The baffles 21 may be in contact with the surface of the process container 20 or separated therefrom (as shown in FIG. 1C)

Figure 2:
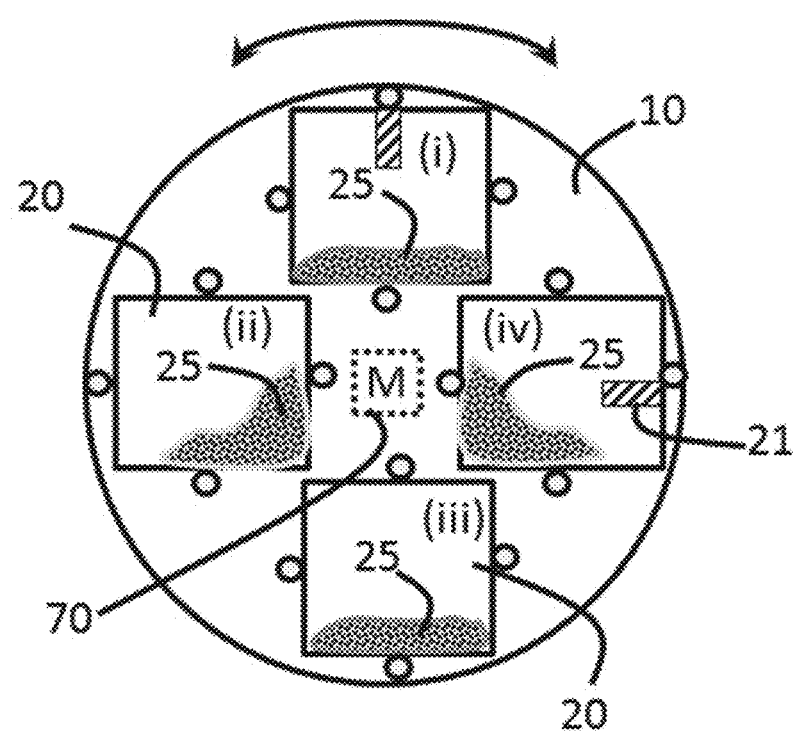
FIG. 2 is a schematic representation of another apparatus used to treat the surface of particles according to the teachings of the present disclosure.

Referring now to FIG. 2, an example of a low pressure system 1 is shown that comprises more than one process container 20 incorporated into a vacuum chamber 10 in order to increase production rate. Alternatively, the number of process containers 20 may greater than two, alternatively three or more, with an example of four containers 20 (*i-iv*) being shown in FIG. 4. The process containers 20 may be round or cylindrical in shape, as well as polygonal in shape. Several specific types of process containers 20 include an intermediate bulk container (IBC) or IBC tote or pallet tank, which is typically square or rectangular in shape or an industrial 55-gallon drum, which is typically round or cylindrical in shape. The vacuum chamber 10 may also be any desired shape including round or cylindrical, as well as polygonal provided that more than one process container 20 can be securely fit within the vacuum chamber 10.

Still referring to FIG. 2, each process container 20 in the low pressure system 1 contains particles 25 to be treated. Each process container 20, optionally, may also include one or more baffles or paddles 21. A portion of each process container 21 (e.g., the baffles, etc.) may be rotated, moved, or vibrated, or the vacuum chamber 10 itself may be rotated, moved, vibrated through the use of a motor 70. One skilled in the art will recognize that this type of motion also causes the movement or tumbling of the particles 25 in a manner conducive to exposing their surface area.

In this type of production system (FIG. 2), each of the process containers 20 may individually be replaced with another process container 20 upon completion of the particle treatment, thereby, facilitating production rate and ease of handling of the treated particles. The particles may be removed from the process container for storage and shipment, stored or shipped in the process container, or incorporated into a fluid medium by the addition of the fluid medium to the process container.

Figure 3A:
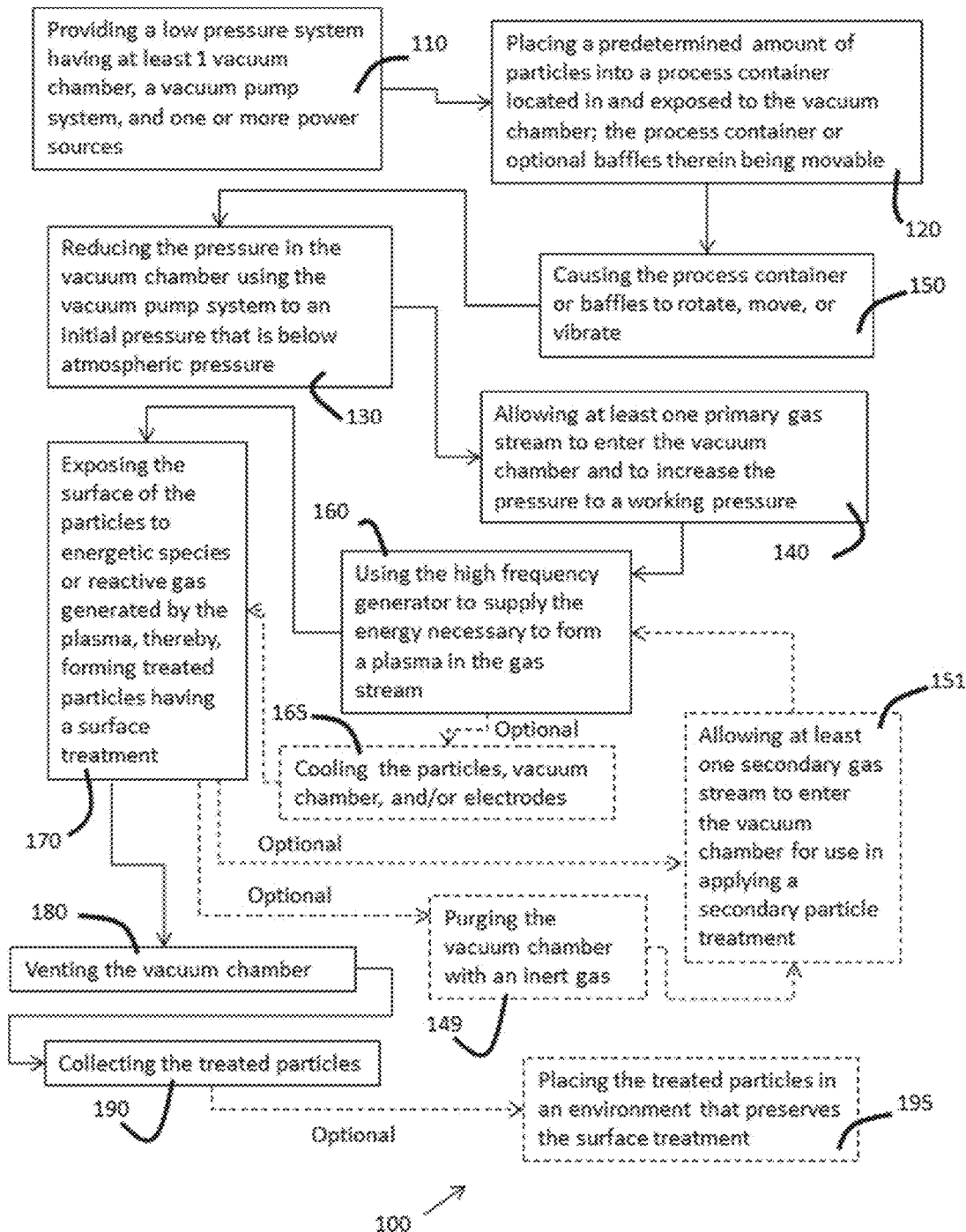
FIG. 3A is a schematic representation of a process used to form surface energy modified particles using the apparatus of FIG. 1 or 2.

Referring now to FIG. 3A, the method or process 100 for modifying the surface energy of particles according to the teachings of the present disclosure comprises: providing 110 the low pressure plasma system described above and herein, placing 120 a predetermined amount of particles into the process container that may optionally include one or more baffles or paddles; causing 150 the process container and/or the baffles to rotate, move, or vibrate; reducing 130 the pressure in the at least one vacuum chamber to an initial pressure that is below atmospheric pressure; allowing 140 at least one gas stream to enter the vacuum chamber and to increase the pressure to a variable working pressure; supplying 160 the energy necessary to form a plasma in the gas stream; exposing 170 the surface of the particles to energetic species or reactive gas generated by the plasma, thereby, forming surface energy modified particles having a surface treatment; venting 180 the vacuum chamber with or without the use of an inert gas, e.g., $N_2$ to purge the chamber, thereby, providing an inert atmosphere; and collecting 190 the surface energy modified particles. Optionally, the process 100 may also include cooling 165 the particles, vacuum chamber, and/or electrodes, as well as placing 195 the treated particles in an environment that preserves the surface treatment.

Still referring to FIG. 3A, according to another aspect of the present disclosure, a first gas, such as nitrogen trifluoride ($NF_3$) may be used to interact with the plasma in order to generate another or a second reactive gaseous species, e.g., Fluorine ($F_2$) that can modify the surface of the particles 170. In this situation, the particles may not need to be in contact with the plasma, but rather the particles can be located downstream from the plasma and interact with the reactive gaseous species formed therein. Alternatively, the particles can be separated from the plasma by a distance that is at least about 30 mm, alternatively at least 50 mm. Alternatively, the reactive gas may be generated in one chamber, while the particles reside in a separate container that is coupled to the chamber in a manner that allows the reactive gas to interact with the particles in order to modify the surface of the particles. The energy of the plasma may assist in creating 170 the reactive gaseous species that can react directly with the surface of the particles.

According to another aspect of the present disclosure as shown in FIG. 3A, a secondary gas stream may be allowed to enter the vacuum chamber 151 for use in applying an additional or secondary treatment to the particles' surface 170. This least one secondary gas stream comprises one or more precursors to reactive energetic species that are different in composition than the one or more precursors in the primary gas stream. Optionally, the vacuum chamber may be purged with an inert gas 149 prior to the introduction of the secondary gas stream.

Figure 3B:
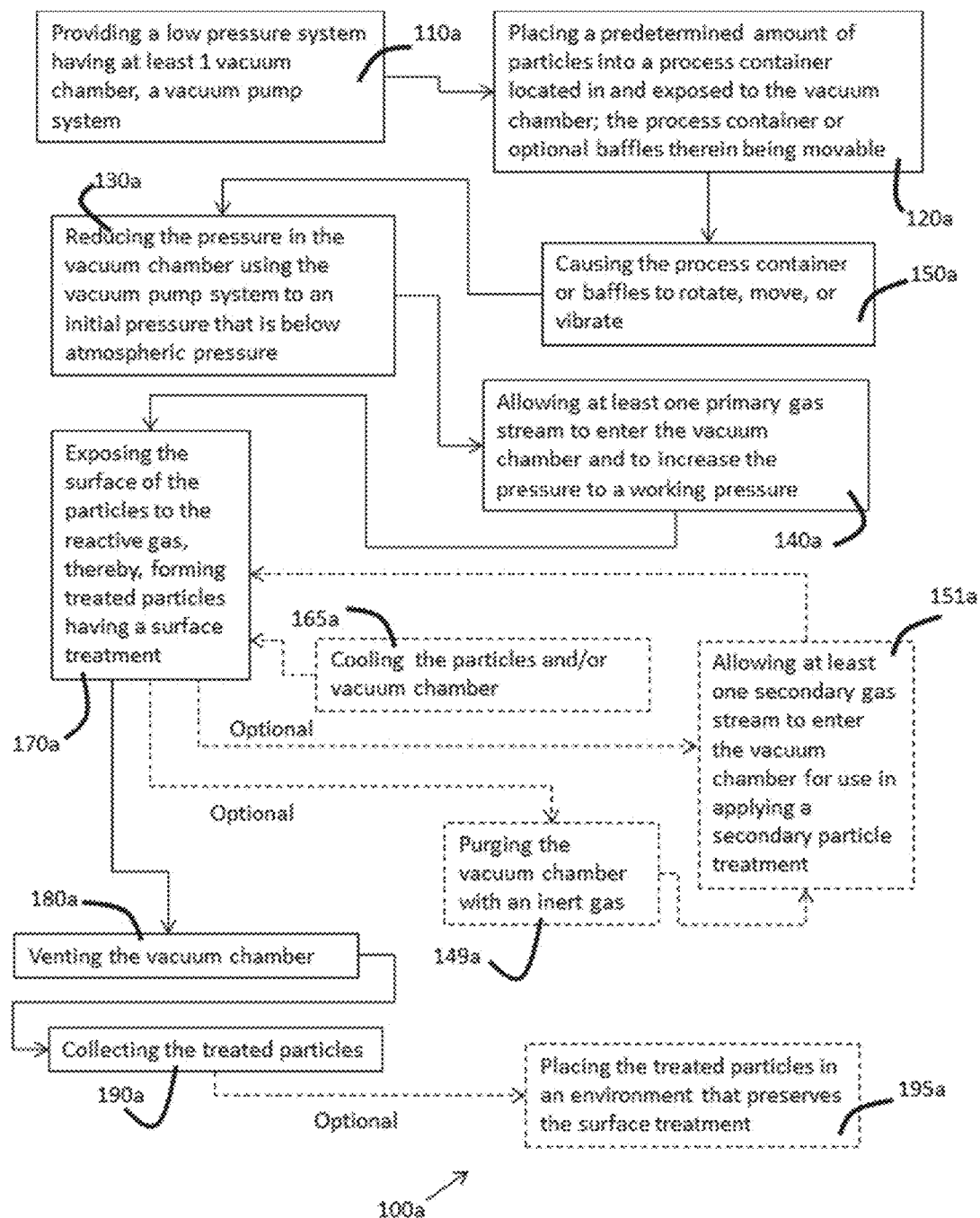
FIG. 3B is a schematic representation of another aspect of the process used to form surface energy modified particles according to the teachings of the present disclosure.

Referring now to FIG. 3B, the method or process 100a for modifying the surface energy of particles according to the teachings of the present disclosure may comprise: providing 110a the low pressure system described above and herein, placing a predetermined amount of particles 120a into the process container that may optionally include one or more baffles or paddles; causing 150 the process container and/or the baffles to rotate, move, or vibrate; reducing 130a the pressure in the vacuum chamber to a working pressure that is below atmospheric pressure; allowing 140a at least one reactive gas stream and to increase the pressure to a variable working pressure, such as fluorine ($F_2$) gas, to enter the vacuum chamber; exposing 170a the surface of the particles to the reactive gas, thereby, forming surface energy modified particles having a surface treatment; venting 180a the vacuum chamber with or without the using an inert gas, e.g., $N_2$ to purge the chamber, thereby, providing an inert atmosphere; and collecting 190a the surface energy modified particles. Optionally the process may further comprise allowing a secondary gas stream to enter the vacuum chamber 151a for use in applying an additional or secondary treatment to the particles' surface 170a. This least one secondary gas stream comprises one or more reactive gases that are different in composition than the one or more gases in the primary gas stream. When desirable, the vacuum chamber may also be purged with an inert gas 149a prior to the introduction of the secondary gas stream.

The process 100a may also include cooling 165a the particles and/or vacuum chamber, as well as placing 195a the treated particles in an environment that preserves the surface treatment. As used herein, the initial pressure established in the apparatus and used in the method of the present disclosure (FIGS. 3A & 3B) is below atmospheric pressure and variable. The working pressure established upon the introduction of the one or more gas streams is greater than the initial pressure. This working pressure is variable and optionally, may be at or above atmospheric pressure. Alternatively, the working pressure of the process may be between 0.001 mbar and 20 bar.

The apparatus 1 of the present disclosure also includes filter system 27 that maintains the particles within the process container 20. One example of a filter system 27 includes without limitation a filter or air permeable containment sheet, layer, or film 27 that is placed over the opening in the process container 20 in order to keep the particles 25 from being dispelled from the container 20 when the vacuum chamber 10 is evacuated. The filter or permeable containment sheet assists in keeping the powder in the process container and prevents particles from entering the vacuum pump. The evacuation of the process chamber removes air that resides between the particles, thereby, reducing the presence of particle agglomerates and providing the opportunity for particles to be dispelled from the process container 20 if the filter or containment sheet is not present. This filter or containment sheet may be held in place by any means known to one skilled in the art including, but not limited to, the use of an elastic band, a mechanical clip, or fastener.

Figure 4:
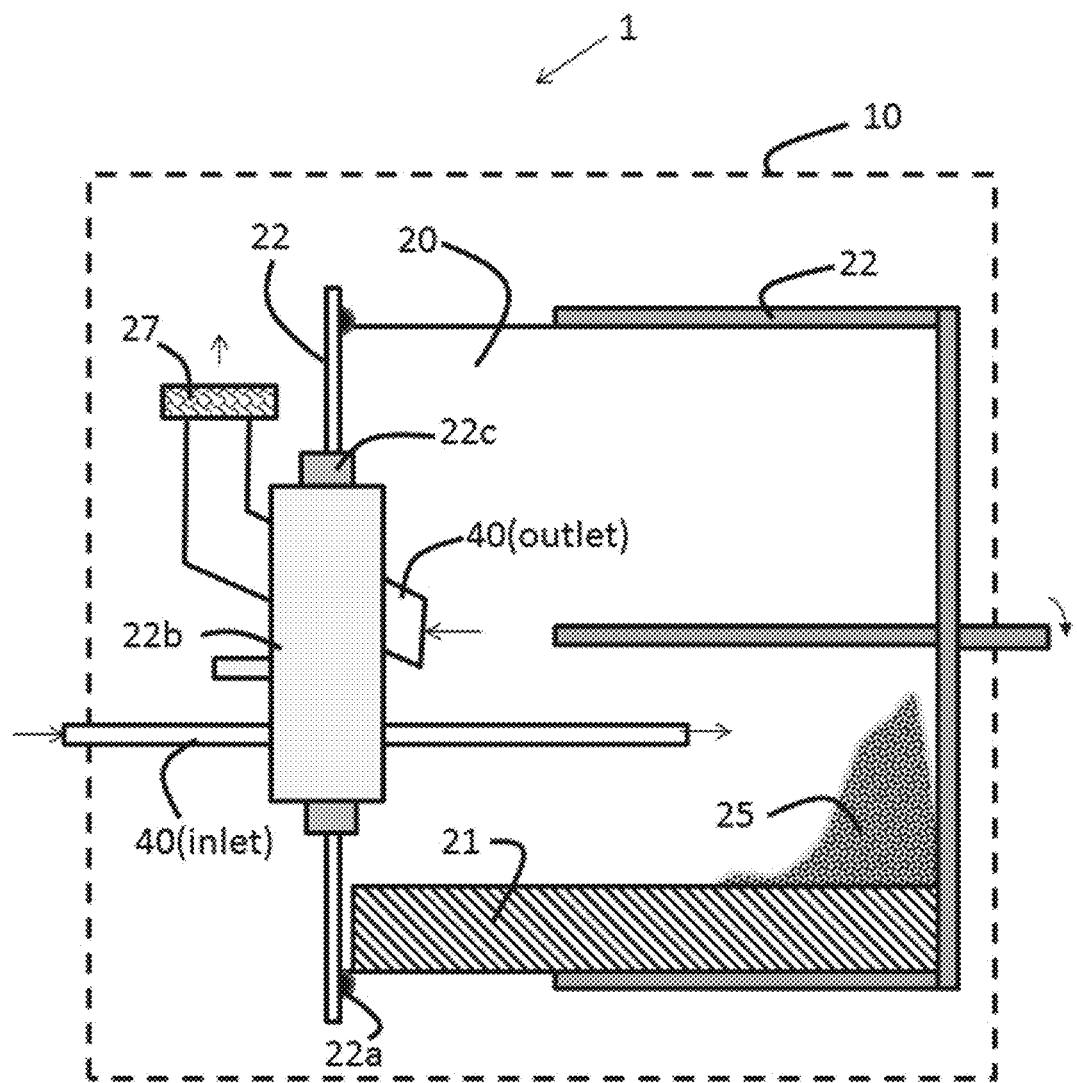
FIG. 4 is a schematic representation of another process container located within an apparatus used for treating the surface of particles according to the teachings of the present disclosure.

Referring now to FIG. 4, another example of a particle container located within a vacuum chamber is shown that highlights the interaction of various components, such as gas inlet/outlets, seals, and filter system that may be used within the apparatus of the present disclosure. In this low pressure system 1, the particle container 20 is located within the vacuum chamber 10 and held in place using a holder 22. This holder 22 may include multiple arms that contact the container 20 to hold it in place when it is rotated, moved, or vibrated. The particle container 20 may also include one or more baffles 21 to assist in moving the particles 25 during the process. The container 20 is equipped with a lid 22 that includes a seal 22a to keep the particles 25 within the container 20 during the process. The lid 22 may also include a pipe, hose, conduit, or other means for the gas to enter 40 (inlet) and exit 40 (outlet) the particle container 20. The gas exit 40 (outlet) may also incorporate the filter 27 to keep the particles within the container 20. The gas entrance 40 (inlet) and exit 40 (outlet) may mounted within the lid 22 through the use of a mechanical mount 22b and bearings or o-ring seals 22c. The lid 22 may be rotatable or stationary during the process depending upon the specific arrangement of the various components with in the lid 22 and the means through which it contacts the container 20

The amount of particles placed in the process container depends upon the size of the apparatus. For example, the amount of particles may range without limitation from a laboratory scale size that is between about 1.0 gram-1.0 kilogram to a production scale size that is in excess of 1.0 kilogram up to several tons (e.g., up to about 5,000 kilograms). The process container 20 may be comprised of any known material including but not limited to a metal, glass and/or ceramics. Optionally, the process container 20 may be electrically insulated from the electrodes 53 through the placement of a gap or space between the electrodes and the wall of the container 20 and/or vacuum chamber 10, optionally an electrically insulating or dielectric material may be used in the construction of the container 20.

The speed at which the process container or the baffles or paddles within the process container is rotated, moved, or vibrated is variable and is determined by the amount of particles placed into the container and the overall volume of the container. The minimal speed at which the process container is rotated, moved, or vibrated provides for movement or the tumbling of the particles such that a substantial portion of the particles' surface area gets exposed to the reactive gas or reactive energetic species formed in the plasma during the process 100 or 100a in order to effectively modify the surface energy of the particles. A substantial portion of the particles' surface area is intended to mean that at least 5% of the particles' surface area is exposed at some point during the process; alternatively, at least 15%; alternatively, at least 30%; alternatively, at least 50%, alternatively, at least 75%, alternatively, at least 90%. Typically, the volume of the process container that is filled with particles to be treated is greater than 0% of the overall container volume, alternatively, greater than about 1%, alternatively, greater than about 5% and less than about 40% of the overall container volume; alternatively, less than about 30%, alternatively, less than about 15%; alternatively, less than about 10%.

Various process parameters, including but not limited to pressure, gas flow rates, and exposure time, as well as optionally, power and frequency associated with the power source, are pre-determined based on the cumulative surface area of the particles that are placed into the process container, the overall volume of the process container and apparatus, and the degree of surface modification that is desirable. Each of these process parameters are monitored and controlled throughout the process. One skilled in the art will understand that these process parameters are interrelated, for example, increasing gas flow rate and reducing exposure time can have an effect on the degree of surface modification that is similar to the effect obtained upon decreasing the gas flow rate and increasing the exposure time. The overall ranges associated with each of these controllable process parameters is provided in Table 1. In addition, the operating pressure may alternatively range from about 0.001 mbar to about 20 bar; alternatively, 0.01 mbar to about 1 bar; alternatively, about 0.3 mbar to about 40 mbar.

TABLE 1

| | |
|---|---|
| Working Pressure | Variable between 0.001 mbar to less than 20 bar |
| Power | 0.1 watts/cm$^2$ to 500 watts/cm$^2$ of electrode surface for kHz and MHz frequency; or 0.01 watts/liter to 1000 watts/liter of chamber volume for GHz frequency |
| Frequency | Low kHz to high GHz range |
| Gas Flow Rate | 1 cm$^3$/min. to 10,000 liters/min. |
| Exposure Time | 1 minute to 100 hours |

A plasma may be generated in the gas stream to which the particles are subjected by the supply of energy from one or more power sources/high frequency generators. The energy may be supplied in a continuous or a pulsed manner. The supplied energy may be provided with power ranging from 0.1 watts/cm$^2$ to about 500 watts/cm$^2$ of electrode surface for kHz and MHz frequencies or between 0.01 watts/liter to 1000 watts/liter of chamber volume for GHz frequency. The frequency may be any kHz to GHz frequency accepted by the International Bureau of Standards (IBS) or U.S. National Bureau of Standards capable of generating a plasma, alternatively, between about 40 kHz and about 2.45 GHz; alternatively, at 40 kHz; alternatively, at 13.56 MHz; alternatively, at 2.45 GHz. The application of the desired energy to form the plasma may be accomplished using any means known to one skilled in the art for generating a plasma. Several specific examples include energizing the gas using radio frequency energy, microwave, alternating electrical current, direct electrical current, or a combination thereof using one or more power sources. According to one aspect of the present disclosure, the plasma system may utilize at least one electrode placed either within or outside the process container located in the vacuum chamber. However, when energy in the microwave (e.g., 2.45 GHz) range is utilized, the use of an aerial built into a magnetron may be incorporated into the plasma system. A magnetron is an electron-tube-oscillator that oscillates at a fixed frequency. Since the aerial of the magnetron must not be located within the vacuum chamber, the microwaves generated by the magnetron are directed onto a glass or ceramic window in order for them to enter the vacuum chamber.

Referring once again to FIGS. 3A and 3B, the collection 190 of the surface energy modified particles includes placing the surface energy modified particles in an environment that preserves the surface treatment. Preservation of the surface treatment may be accomplished by packaging or placing the surface energy modified particles in their powder form into a jar, bag, or other container that is subsequently sealed. Alternatively, a modified atmospheric package (MAP) may be utilized. The preservation of the surface treatment assists in decreasing or eliminating the flocculation of the particles and/or the reoccurrence of agglomeration. The packaging may be accomplished in a "dry" air atmosphere, or optionally, under nitrogen or another inert atmosphere if the particles are sensitive to being exposed to air (e.g., $O_2$) or moisture.

The preservation of the surface treatment may also be accomplished by pelletizing the energy modified particles or dispersing the surface energy modified particles into a flowable medium followed by storage of the dispersion in a sealed container. The flowable medium can be any known liquid or mixtures of liquids that are typically used for preparing particle dispersions. The flowable medium can be water or an organic solvent, such as aliphatic hydrocarbons, aromatic hydrocarbons, ketones, esters, glcyols, or alcohols to name a few. Alternatively, the flowable medium is water, methanol, ethanol, propanol, or another alcohol, naphtha, methyl isobutyl ketone (MIBK), or a mixture thereof. The flowable medium may also be any polymer, plastic, elastomer, or gum stock, as well as a mixture thereof. Since the surface energy modified particles are generally intended to be dispersed in a flowable medium during the preparation of a final product formulation, such as a coating, a film, an ink, a paint, a plastic or elastomeric manufactured good, or an adhesive, the flowable medium used for the preservation of the surface treatment during storage may be the same as the flowable medium used to prepare the final product formulation.

One advantage of the present invention is that the modified or surface energy modified particles are more easily dispersible in the desired liquid and formed into a final product composition, thereby, eliminating the need for any form of milling operation to reduce particle agglomeration. In fact, the use of a milling operation in conjunction with dispersions of the surface energy particles formed according to the present disclosure has been found not to result in any additional reduction in the mean particle size exhibited for the particles present in the dispersion. The surface energy modified particles are found to reduce or eliminate the reoccurrence of particle agglomeration or flocculation during and after the dispersion process.

In addition, the surface energy modified particles of the present disclosure are found to exhibit stability with respect to color strength. Another benefit of the present disclosure, is that the ease in which multiple different types of surface energy modified particles can be dispersed in the same flowable medium compositions, thereby, allowing manufacturers of finished products, such as paints or coatings, to reduce the number of different flowable mediums and select one flowable medium for use with all pigments when forming solventborne products and/or water when forming waterborne products.

The surface energy modified particles can be added to and mixed with a flowable medium using any known classical technique to form a dispersion. The dispersion technique utilized may include any means known to one skilled in the art, including without limitation the use of hand stirring, an ultrasonicator, a paint shaker, a high shear mixer, a planetary mixer, or a magnetic stirrer. Typically, the amount of surface energy modified particles that are present in the final stabilized dispersion ranges from about 0.1 wt. % to 80 wt. %; alternatively, between about 0.55 wt. % and 65 wt. %; alternatively, from about 1 wt. % to about 50% by weight relative to the total weight of the dispersion. The increase in surface energy associated with the surface energy modified particles allows the particles to be easily dispersed in the flowable medium.

The liquid dispersion of surface energy modified particles prepared according to the teachings of the present disclosure exhibits stability over a predetermined period of time. The term "stability" refers to preventing the flocculation of particles from occurring as evaluated by observation or through the use of a particle size analyzer. The predetermined period of time over which the dispersions are stable is for 48 hours or more at a temperature of 40° C.; alternatively, for at least one week at ambient temperature (25° C.); alternatively, for more than several months at ambient temperature. When water or a water/solvent mixture is used as the flowable medium, the stability of the liquid dispersion of surface energy modified particles can be enhanced by raising the pH of the water or water/solvent mixture to be above neutral (pH=7.0); alternatively, above 8.0; alternatively above about 8.5; alternatively, between greater than 7.0 and less than about 12.0; alternatively between greater than 7.0 and less than about 10.0. The pH of the water or water/solvent mixture may be increased by adding a water soluble amine to the water. Optionally, an ionic surfactant, nonionic surfactant, or other dispersing agent may be added to the flowable medium to ensure long-term stability of the particle dispersion and to reduce or eliminate particle flocculation or the reoccurrence of agglomeration. The nonionic surfactant, ionic surfactant, or other dispersing agent may be added to the dispersion in a range of about 0.01 wt. % to about 10.0 wt. %; alternatively, about 0.1 wt. % to about 3 wt. % relative to the weight of the treated particles present in the dispersion. This dispersing agent may assist in the prolonged stabilization of the surface treatment applied to the surface of the particles.

These dispersing agents may be compounds, such as short-chain fatty acids, that are amphiphilic or amphipathic in nature. In other words, these dispersing agents are formed by combining one or more hydrophobic (lipophilic) groups and one or more hydrophilic (lipophobic) groups that are spatially arranged in a single molecule, such that one part of the molecule exhibits an affinity for nonpolar media and another part of the molecule exhibits an affinity for polar media. During use, these molecules form oriented monolayers at the interface between the surface energy modified particles and the liquid media. The overall effect is to lower the surface or interfacial tension of the liquid in which they are dissolved.

The efficacy of these dispersing agents depends on the nature and ratio of the hydrophilic to hydrophobic groups, as well as their spatial arrangement. Typically, the hydrophilic groups include electrically charged (i.e. ionic) groups as well as uncharged but polar structures. The hydrophobic groups include the rest of the molecule and cover a large variety of aliphatic and aromatic structures. Several specific examples of such a dispersing agent include Nuosperse FA196 (Elementis Specialties Inc.), Nuosperse 9850 (Elementis Specialties Inc.), Disperbyk 163 (BYK-Chemie GmbH), SilcoWet 065 (Silcona GmbH & CO. KG), and various tensides, to name a few.

According to another aspect of the present disclosure, a finished product composition is prepared by incorporating the surface energy modified particles or a dispersion of surface energy modified particles formed according the teachings of the present disclosure into a formulation with other additives and materials. For example, a coating composition can be prepared by adding at least one binder, and optionally a dispersing agent and/or a curing catalyst, to the stabilized dispersion. One skilled in the art will understand that the finished product compositions may be a coating, an ink, a film, a composite, a plastic or elastomeric manufactured good, a gel, an ointment, an adhesive, a paste, or another type of formulation without exceeding the scope of the present disclosure. The finished product composition may incorporate at least 0.1 wt. % of the treated particles or the stabilized dispersion prepared according to teachings of the present disclosure; alternatively, between about 0.1 wt. % and about 80 wt. %, alternatively, at least 1%; alternatively, between about 1% and about 50% relative to the weight of the entire finished product composition. The amount of treated particles or stabilized dispersion that is incorporated into the finished product composition is dependent upon the application requirements and the product performance desired. The finished product composition may also comprise a plurality of untreated particles in addition to the treated particles.

The following specific embodiments are given to illustrate the preparation and use of particles that have been treated according to the teachings of the present disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Example 1—Surface Treatment of Copper Phthalocyanine Particles

A total of 45 grams of copper phthalocyanine particles (Heliogen® Blau L 7085, BASF) is added to a rectangular processing container incorporated into a low pressure system according to FIGS. 1(A-C) and FIG. 4. The process container is rotated at a rotation range of 50 rotations per minute (rpm).

The copper phthalocyanine particles are treated according to the method described in FIG. 3B. More specifically, the vacuum chamber and process container are exposed during the process to an initial pressure on the order of $7\times10^{-2}$ torr. A primary gas stream is introduced to the process container that comprises 10% fluorine ($F_2$) gas and 90% nitrogen ($N_2$) gas set at a flow rate of 100 $cm^3$/minute (sccm). The pressure is increased to a working pressure of $4.3\times10^{-1}$ torr. The particles are exposed to the primary gas stream for 20 minutes. Then the flow rate of the primary gas stream is increased to 1000 sccm and the working pressure is increased to 2.5 torr for a period of 90 minutes. The low pressure system is purged with air or nitrogen three times and vented. The treated particles are collected and stored under a nitrogen atmosphere for future use and testing.

A 20 wt. % dispersion using untreated copper phthalocyanine particles in methyl isoamyl ketone (MIAK) is prepared. The incorporation of untreated copper phthalocyanine particles in MIAK is done using hand stirring, as well as shaking using a conventional paint shaker for 5 minutes. Treated copper phthalocyanine particles are dispersed in MIAK under the same conditions to form another 20 wt. % dispersion. The treated copper phthalocyanine particles are observed to be more easily dispersed in the MIAK.

The particle size distributions of untreated copper phthalocyanine particles and for a MIAK dispersion of treated copper phthalocyanine particles are measured and analyzed using a Beckman Coulter™ particle size analyzer. The particle size distribution exhibited by the dispersed treated copper phthalocyanine particles is compared against the particle size distribution exhibited by the untreated copper phthalocyanine particles in FIG. 5A. Each of the samples yields a right skewed unimodal size distribution. However, the treated particle dispersion exhibits a smaller median or average particle size as well as a narrower overall distribution. The average or median particle size ($D_{50}$) measured for the treated particles in the MIAK dispersion is on the order of 0.403 µm with the overall range being from about 0.04 µm to about 2.9 µm. The average or median particle size ($D_{50}$) measured for the untreated particles is on the order of 1.902 µm with the overall range being from about 0.04 µm to about 76 µm.

The volume statistics for the particle size distributions of treated and untreated particles dispersed in MIAK shown in FIG. 5A is more fully described in FIGS. 5B and 5C, respectively. This Example demonstrates that copper phthalocyanine particles treated according to the teachings of the present disclosure are more easily dispersed in a liquid medium with less particle agglomeration than conventional untreated copper phthalocyanine particles.

Example 2—Surface Treatment of Carbon Black Particles

A total of 18 grams of carbon black powder (Degussa® Printex U, Evonik Industries) is added to a rectangular processing container incorporated into a low pressure system according to FIGS. 1(A-C) and FIG. 4. The process container is rotated at a rotation range of 50 rotations per minute (rpm).

The carbon black powder is treated according to the method described in FIG. 3B. More specifically, the vacuum chamber and process container are exposed during the process to an initial pressure on the order of $3\times10^{-2}$ torr. A primary gas stream is introduced to the process container that comprises 10% fluorine ($F_2$) gas and 90% nitrogen ($N_2$) gas set at a flow rate of 700 $cm^3$/minute (sccm). The pressure is increased to a working pressure of $4.3\times10^{-1}$ torr. The powder is exposed to the primary gas stream for 90 minutes. The low pressure system is purged with nitrogen three times and then vented. The treated particles are collected and stored under a nitrogen atmosphere for future use and testing.

A 20 wt. % dispersion using untreated carbon black powder in methyl isoamyl ketone (MIAK) is prepared. The incorporation of untreated carbon black particles in MIAK is done using hand stirring, as well as shaking using a conventional paint shaker for 5 minutes. Treated carbon black particles are dispersed in MIAK under the same conditions to form another 20 wt. % dispersion. A third 10 wt. % dispersion of treated particles is prepared under the same conditions using deionized water as the liquid medium and 0.4 wt. % of a silicone surfactant (BYK®-349, BYK-Gardner GmbH). The pH of the water dispersion is measured to be 9.5. The treated carbon black particles are observed to be more easily dispersed in the MIAK and/or the water in comparison to the dispersion of untreated particles in MIAK.

The particle size distributions of untreated carbon black particles and for the MIAK and water dispersions of treated carbon black particles are measured and analyzed using a Beckman Coulter™ particle size analyzer. The particle size distributions exhibited by the dispersed treated carbon black particles is compared against the particle size distribution exhibited by the untreated carbon black particles in FIG. 6A. Each of the samples yields a right skewed trimodal size distribution. However, the treated particle dispersion exhibits a smaller median or average particle size as well as a narrower overall distribution. The average or median particle size ($D_{50}$) measured for the treated particles in the MIAK dispersion is on the order of 0.528 µm with the overall range being from about 0.112 µm to about 2.92 µm. The average or median particle size ($D_{50}$) measured for the treated particles in the water dispersion is on the order of 0.685 µm with the overall range being from about 0.102 µm to about 2.92 µm. The average or median particle size ($D_{50}$) measured for the untreated particles dispersed in MIAK is on the order of 6.060 µm with the overall range being from about 0.148 µm to about 26.24 µm. The untreated particles could not be dispersed in water.

Figure 6A:
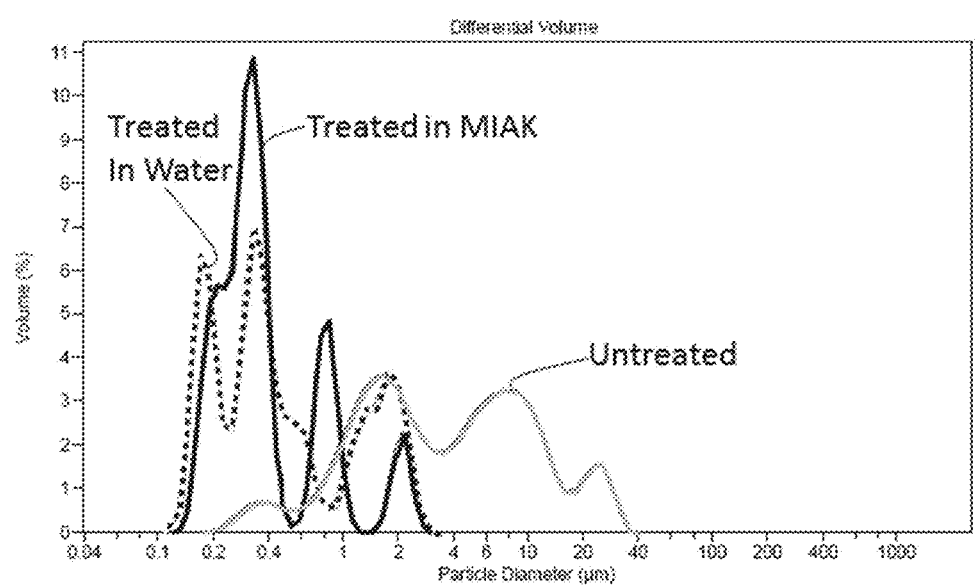
FIG. 6A is a comparison of the particle size distribution measured for a dispersion of treated carbon black particles dispersed in methyl isoamyl ketone (MIAK) and water against the particle size distribution measured for untreated carbon black powder dispersed in MIAK.

The volume statistics for the particle size distributions of treated particles dispersed in water; treated particles dispsersed in MIAK, and untreated particles dispsered in MIAK shown in FIG. 6A are more fully described in FIGS. 6B-6D, respectively. This Example demonstrates that carbon black particles treated according to the teachings of the present disclosure are more easily dispersed in a liquid medium with less particle agglomeration than conventional untreated carbon black particles.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A process for modifying the surface energy of particles, the process comprising:

providing a low pressure system having at least one vacuum chamber, a vacuum pump system, and, optionally, one or more power sources;

placing a predetermined amount of particles in powder form having a mean particle size ranging from 10 nm to less than 50 µm into a process container that has a center axis with at least a portion of the process container capable of being rotated, moved, or vibrated, such that the particles are stirred or moved; the process container either being the vacuum chamber or a separate container located in and exposed to the vacuum chamber; wherein the particles exhibit a first particle size distribution when dispersed in a solvent, the first particle size distribution defining a median particle-agglomerate size ($D_1$);

placing a filter in contact with the process container, such that the filter keeps the particles from being dispelled from the process container when the vacuum chamber is evacuated and prevents particles from entering the vacuum pump system;

causing the at least a portion of the process container to rotate, move, or vibrate;

reducing the pressure in the vacuum chamber using the vacuum pump system to an initial pressure that is below atmospheric pressure;

allowing at least one primary gas stream to enter the vacuum chamber; the at least one primary gas stream having a variable or pulsed flow rate, wherein the at least one primary gas stream comprises at least one reactive gas or precursor gas, wherein the precursor gas forms the reactive gas upon exposure to a plasma;

adjusting the pressure in the low pressure system using the vacuum pump system, changing the flow rate of the primary gas stream, or a combination thereof to establish a working pressure that is either the same as or different from the initial pressure, provided that the working pressure is less than atmospheric pressure;

using the one or more power sources to supply energy to form the plasma in the gas stream when the gas stream comprises at least one precursor gas, the plasma interacting with the precursor gas to form reactive energetic species and the reactive gas, the plasma being separated from the particles at such a distance that the particles are not subjected to an interaction with the reactive energetic species nor the plasma; wherein the temperature is maintained at about ambient temperature exposing the surface of the particles to the at least one reactive gas, thereby, forming energy modified particles having a surface treatment that increases the surface energy of the particles, while exhibiting stability with respect to color strength exhibited by the particles, the surface treatment being applied to the particles with the low pressure system being near ambient temperature;

venting the vacuum chamber; and collecting the energy modified particles from the process chamber; the energy modified particles exhibiting a second particle size distribution when dispersed in a solvent, the second particle size distribution defining a median particle-agglomerate size ($D_2$); wherein $D_1 > D_2$;

wherein the energy modified particles are capable of being dispersed in a water/solvent mixture.

2. The process according to claim 1, wherein the step of collecting the energy modified particles involves pelletizing the energy modified particles or placing the energy modified particles in an environment that preserves the surface treatment.

3. The process according to claim 2, wherein preserving the surface treatment includes one selected from placing the energy modified particles into a sealable container or dispersing the energy modified particles in a flowable medium, wherein the flowable medium is water, an organic solvent, a polymer, a gum stock, or a mixture thereof.

4. The process according to claim 1, wherein the process container is spherical, elliptical, or cylindrical in shape, or the process container has a polygonal shape with three or more sides, optionally, the polygonal shape is triangular, square, or rectangular;

wherein the process container is rotated, moved, or vibrated around its center axis or in any direction other than around its center axis.

5. The process according to claim 1, wherein the process chamber includes at least one baffle; the at least one baffle being the portion of the process chamber that is rotated, moved, or vibrated.

6. The process according to claim 1, wherein the process further comprises:

allowing at least one secondary gas stream having a variable or pulsed flow rate to enter the vacuum chamber, wherein the at least one secondary gas stream comprises one or more reactive gases or precursors to reactive energetic species that are different in composition than the one or more reactive gases or precursors in the primary gas stream;

optionally, purging the vacuum chamber with an inert gas prior to introduction of the at least one secondary gas stream;

readjusting the pressure in the low pressure system using the vacuum pump system, changing the flow rate of the secondary gas stream, or a combination thereof to reestablish a working pressure that is either the same as or different from the initial pressure;

exposing the surface of the particles to either the one or more reactive gases in the secondary gas stream or the reactive energetic species generated by the interaction of the plasma with the secondary gas stream, thereby, providing a second surface treatment to the energy modified particles.

7. The process according to claim 3, wherein the energy modified particles are dispersed in the flowable medium by stirring, mixing, shaking, or a combination thereof.

8. The process according to claim 3, wherein the flowable medium further includes an ionic surfactant, a non-ionic surfactant, or a combination thereof.

9. The process according to claim 3, wherein the flowable medium is water, a mixture of water and one or more organic solvents, or a mixture of two or more organic solvents;

wherein, the pH of the water in the water or the water/solvent mixture is greater than 7.0 and less than about 10.0.

10. The process according to claim 1, wherein the at least one power source uses radio frequency energy, microwaves, alternating electrical current, direct electrical current, or a combination thereof in generating the plasma and supplies the energy in the frequency range of 40 kHz to 2.45 GHz and at a power ranging from 0.1 watts/cm$^2$ to about 500 watts/cm$^2$ of electrode surface for kHz and MHz frequencies or between 0.01 watts/liter to 1000 watts/liter of chamber volume for GHz frequency.

11. The process according to claim 1, wherein the at least one gas stream includes a gas selected from the group of fluorine ($F_2$), nitrogen trifluoride, sulfur hexafluoride ($SF_6$), tetrafluoromethane ($CF_4$), or hexafluoroethane ($C_2F_6$).

12. The process according to claim 11, wherein the at least one gas stream includes a second gas selected from the group of nitrogen, argon, helium, neon, xenon, and krypton, such that the ratio of the first gas to second gas is within the range of about 40:60 to about 1:99.

13. The process according to claim 1, wherein the particles are selected as one from the group of metals, metalloids, metal oxides, metalloid oxides, carbon black or graphite, organic resins or pigments, silicone resins, mineral fillers, inorganic resins or pigments, organometallic oxides, organometalloid oxides, organomixed oxide resins, and silicone or organic rubber crumb.

14. The process according to claim 1, wherein the particles have a mean particle agglomerate size of $D_1$ in the range of 1 nanometer up to about 100 micrometers.

15. The process according to claim 1, wherein the surface of the particles exhibits a surface area that is in the range of 1.0 m$^2$/g to 5.0×10$^3$ m$^2$/g.

16. The process according to claim 1, wherein the at least one gas stream has a variable flow rate that is between 1 cm$^3$/min and 10,000 liters/min.

17. The process according to claim 1, wherein the process further comprises cooling the particles, vacuum chamber, or at least one component therein, optionally, the at least one component being an electrode.

18. The process according to claim 1, wherein the power source includes a plurality of electrodes that are used to provide the energy necessary to form the plasma; the plurality of electrodes being located either in the process container or outside the process container, optionally, in a second vacuum chamber.

19. The process according to claim 1, wherein the process further comprises at least one load lock chamber; wherein the at least one load lock chamber allows the process to be operated as a continuous process.

* * * * *